No. 739,984. PATENTED SEPT. 29, 1903.
C. A. CASE.
ROLLER BEARING SUPPORT FOR TRACK CABLES.
APPLICATION FILED AUG. 29, 1902.
NO MODEL. 2 SHEETS—SHEET 1.
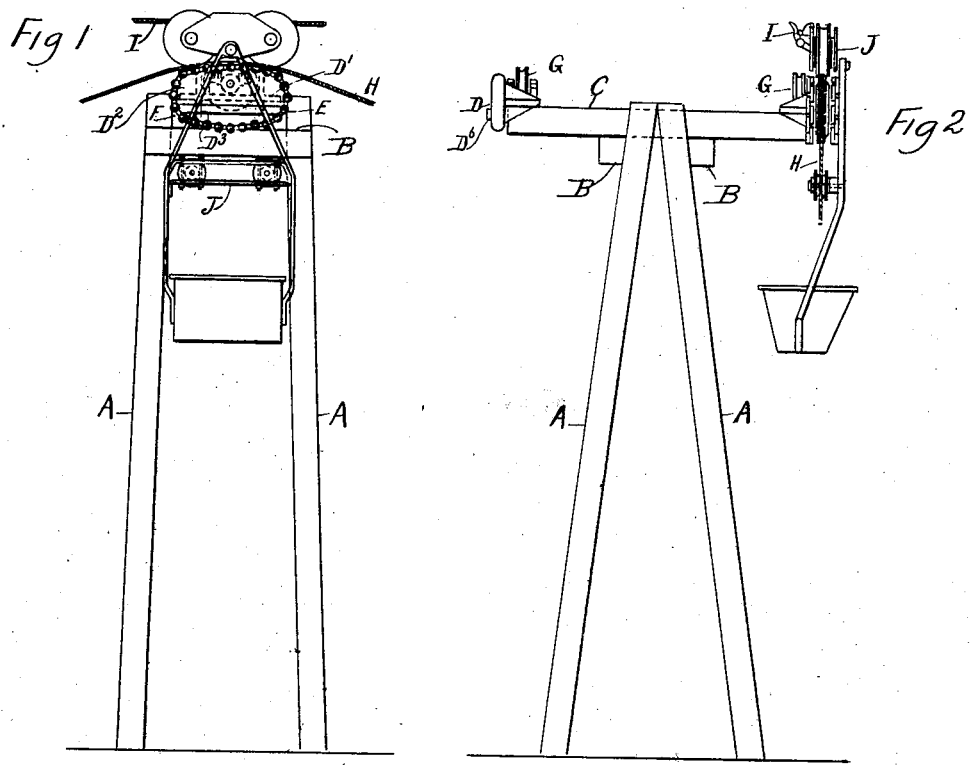
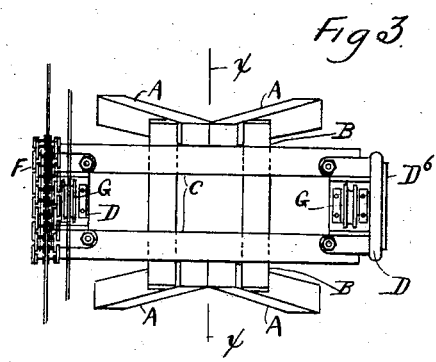

No. 739,984. PATENTED SEPT. 29, 1903.
C. A. CASE.
ROLLER BEARING SUPPORT FOR TRACK CABLES.
APPLICATION FILED AUG. 29, 1902.
NO MODEL. 2 SHEETS—SHEET 2.
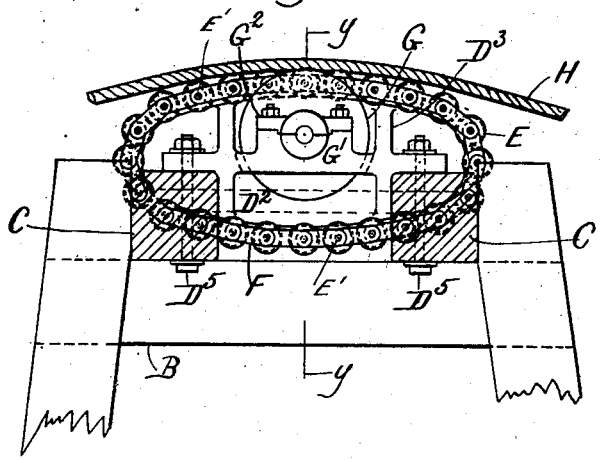
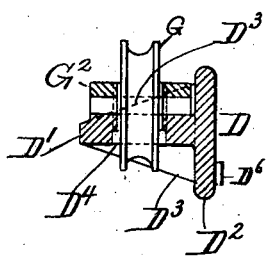
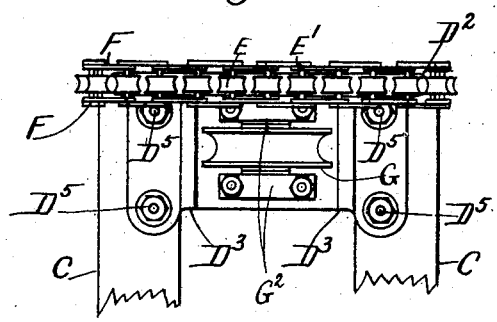

No. 739,984.

Patented September 29, 1903.

UNITED STATES PATENT OFFICE.

CHARLES A. CASE, OF TRENTON, NEW JERSEY.

ROLLER-BEARING SUPPORT FOR TRACK-CABLES.

SPECIFICATION forming part of Letters Patent No. 739,984, dated September 29, 1903.

Application filed August 29, 1902. Serial No. 121,464. (No model.)

*To all whom it may concern:*

Be it known that I, CHARLES A. CASE, a citizen of the United States of America, and a resident of Trenton, in the county of Mercer and State of New Jersey, have invented certain new and useful Improvements in Roller-Bearing Supports for Track-Cables, of which the following is a specification.

This invention relates to supports for track-cables, and its object is the production of roller-bearing supports for the said cables which will allow the cables to move and adjust themselves on the supports without excessive friction.

Referring to the drawings, Figure 1 represents an elevation of a tower with my invention and a cable-carriage. Figs. 2 and 3 show respectively a partial end and top view of Fig. 1. Fig. 4 represents a section of Fig. 3 on the line $x\ x$, on an enlarged scale. Fig. 5 shows a partial section of Fig. 4 on the line $y\ y$. Fig. 6 is a top view of Fig. 4.

A tower to carry my supports is represented to comprise the inclined posts A, connected by rafters B, which latter support the beams C, that carry the supports or saddles D.

Each of the supports or saddles D comprises a bed-plate D', from which extends a bearing-plate $D^2$, the two latter being generally connected by ribs $D^3$. The bearing-plate is preferably made elliptical in its contour, as shown in the drawings, although it may be made circular or of other curvature, and the circumferential surface thereof is preferably semicylindrical to form a suitable support for the concaved rollers E, which encircle the support or saddle on the circumferential surface. The rollers E are supported on axles E', that are carried on linked chains F, the combination of the support with the rollers forming a roller-bearing support.

In the bed-plate D' there is formed an opening $D^4$ to allow the insertion of a roller G, which turns in the bearings G' with the caps $G^2$, the former extending from the said bed-plate. The roller G serves as a guide and support for the traction-rope I of the carriage J, carried on the cable H, and prevents the said traction-rope coming into contact with the beams of the tower when the carriage is not over the said tower. Bolts $D^5$ fasten the support or saddle D to the beams C of the tower.

I sometimes extend the lower portion of the bearing-plate, as shown at $D^6$, to constitute a guide, by means of which the trolley or carriage J is prevented coming into contact with the linked chains F.

In a track-cable system the cables are arranged to move as freely as possible over the supports, and when a trolley or carriage of the system is between the supports the cable is caused to move over the said supports by reason of the weight of the trolley on the cable.

By the application of my roller-bearing support to track-cables it is evident that the cables can move thereon without excessive friction.

Having described my invention, I claim—

1. In a track-cable system the combination of a support, rollers encircling and carried on the support, and a cable carried by the rollers.

2. In a track-cable system the combination of a support, rollers encircling and carried on the support, means to maintain the rollers to the support, and a cable carried by the rollers.

3. In a track-cable system the combination of a support, rollers encircling and carried on the support, means to connect the rollers together, and a cable carried by the rollers.

4. In a track-cable system the combination of a support, rollers encircling and carried on the support, and chains connecting the rollers together.

5. The combination of a support, a bearing-plate with a semicircular circumferential edge on the support, rollers with concaved circumferential surfaces encircling and carried on the circumferential edge of the said bearing-plate.

6. In a track-cable system the combination of a support, rollers encircling and carried on the support, means to connect the rollers together, a cable carried by the rollers, and a roller in the support to guide a traction-rope.

7. The combination of a support a bearing-plate extending from the support, rollers carried on and encircling the said plate, a chain connecting the rollers, and a roller journaled in the support.

8. In a track-cable system, the combination of a support, a bearing-surface semicircular in cross-section extending from the support, rollers with concaved surfaces carried on and encircling the said bearing-surface, and a cable carried on the rollers.

9. In a track-cable system the combination of a support, a bearing-plate extending from the support, rollers carried on and encircling the said plate, chains connecting the rollers, a cable carried by the rollers, and a guide extending from the said bearing-plate.

Signed at New York, county and State of New York, this 23d day of August, 1902.

CHARLES A. CASE.

Witnesses:
R. P. EDSON,
FRANK A. COX.